(12) United States Patent
Kubo (10) Patent No.: US 6,279,710 B1
(45) Date of Patent: Aug. 28, 2001

(54) ELECTROMAGNETIC CLUTCH

(75) Inventor: Tsutomu Kubo, Akashi (JP)

(73) Assignee: Kyocera Mita Corporation, Osaka-fu (JP)

( * ) Notice: Subject to any disclaimer, the term of this patent is extended or adjusted under 35 U.S.C. 154(b) by 0 days.

(21) Appl. No.: 09/540,458

(22) Filed: Mar. 31, 2000

(30) Foreign Application Priority Data

Apr. 2, 1999 (JP) .................................................. 11-096942
Oct. 8, 1999 (JP) .................................................. 11-288314

(51) Int. Cl.[7] .................................................. F16D 27/02
(52) U.S. Cl. .................................................. 192/84.961
(58) Field of Search ........................... 192/86.961, 84.1, 192/84.9, 84.96, 66.32

(56) References Cited

U.S. PATENT DOCUMENTS

| | | | |
|---|---|---|---|
| 4,079,821 | * | 3/1978 | Miller .................................. 192/84 C |
| 4,346,616 | * | 8/1982 | Geisslinger et al. ............... 192/84 C |
| 4,664,238 | * | 5/1987 | Nishino et al. ..................... 192/84 C |
| 4,955,954 | * | 9/1990 | Onishi et al. ................... 192/84 C X |
| 4,984,668 | * | 1/1991 | Onishi et al. ...................... 192/84 C |
| 5,036,368 | * | 7/1991 | Nakamura ..................... 192/84 C X |
| 5,038,905 | * | 8/1991 | Nakamura ........................... 192/84 C |
| 5,080,214 | * | 1/1992 | Fossum ......................... 192/84 C X |
| 5,148,902 | * | 9/1992 | Nakamura ........................... 192/84 C |
| 5,735,375 | * | 4/1998 | Booth et al. ..................... 192/84.961 |
| 5,762,173 | * | 6/1998 | Nishimura ...................... 192/84.961 |
| 5,862,902 | * | 1/1999 | Howrie ............................ 192/84.961 |
| 6,031,309 | * | 2/2000 | Nishimura ................... 192/84.961 X |
| 6,112,872 | * | 9/2000 | Miwa et al. ................. 192/84.961 X |

* cited by examiner

Primary Examiner—Rodney H. Bonck
Assistant Examiner—Saúl Rodríguez
(74) Attorney, Agent, or Firm—Jordan and Hamburg LLP

(57) ABSTRACT

An electromagnetic clutch has a gear formed with a tubular part having a hollow portion into which a shaft is inserted. The tubular part is formed with a plurality of position restrainers each consisting of a pair of position restricting projections formed at a base end on an outer periphery thereof, and a plurality of slip stopper projections formed at a lead end thereof. An armature and a ring member are mounted on the shaft in such a manner as to oppose to the slip stopper projections. The armature is formed with a through hole for inserting the tubular part of the gear, and a projection that is fitted in a space between each pair of the position restricting projections. The ring member is made of an elastic polymer and has a radial thickness generally greater than a distance between the outer surface of the tubular part and a lead end of the projection of the armature mounted on the tubular part of the gear. The ring member is mounted on the tubular part in such a manner that the slip stopper projections keep the armature from disengaging from the gear.

13 Claims, 9 Drawing Sheets

ELECTROMAGNETIC CLUTCH

This application is based on patent application Nos. 11-96942 and 11-288314 filed in Japan, the contents of which are hereby incorporated by reference.

BACKGROUND OF THE INVENTION

The present invention relates to an electromagnetic clutch in which a shaft rotatable about an axis thereof is electrically connected to an input-side rotary member such as a gear which is rotatably mounted onto the shaft.

Figure 8:
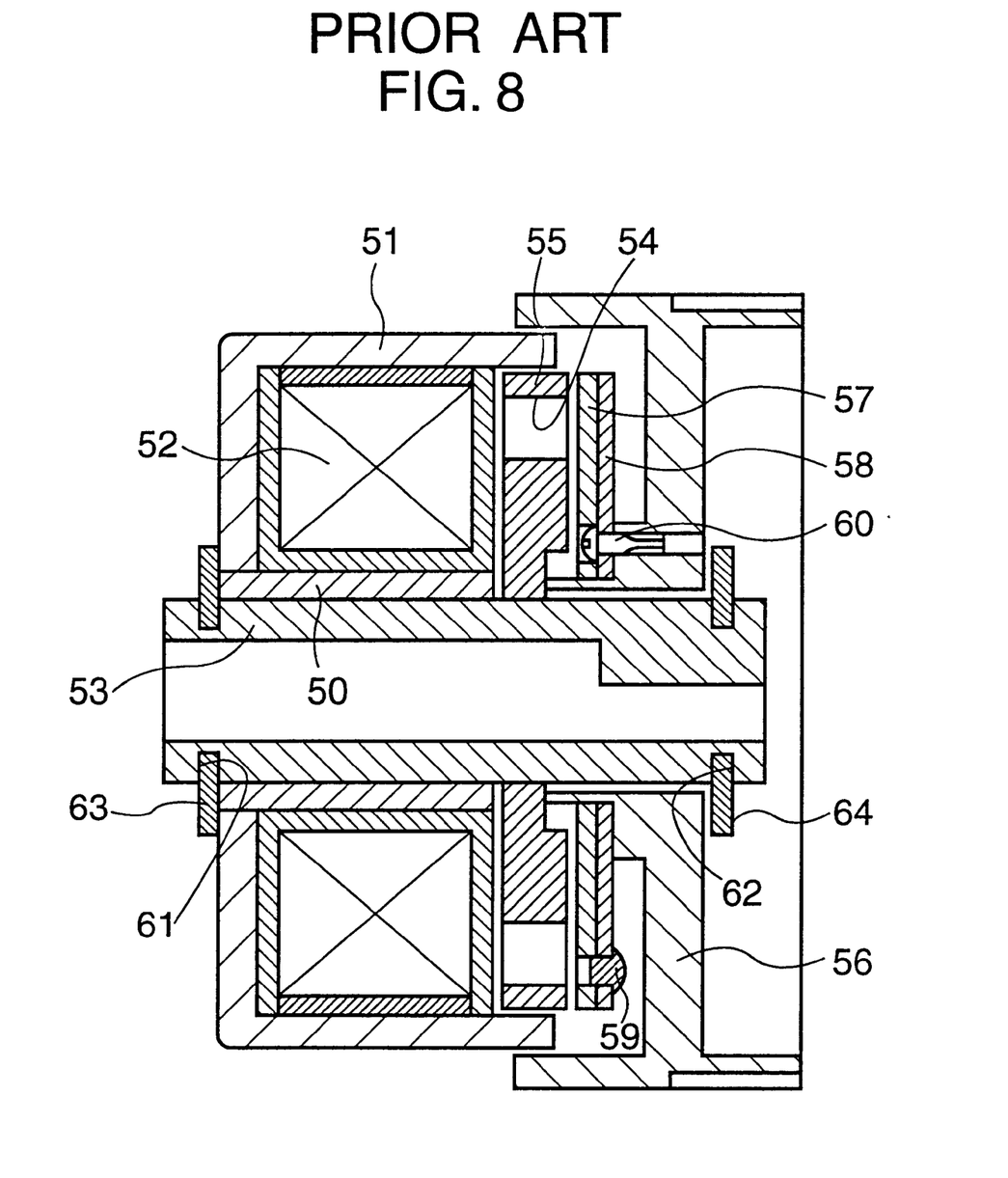
FIG. 8 is a cross-sectional view of an electromagnetic clutch of prior art.

Heretofore, an electromagnetic clutch of the above type has been constructed, for example, as shown in FIG. 8, which is a cross-sectional view of the electromagnetic clutch. The electromagnetic clutch shown in FIG. 8 is generally used as a part operatively connected to a sheet feed mechanism of an image forming apparatus such as a copier. The electromagnetic clutch includes a field 51 of a blind-hole double-layered tubular structure having a tubular fitting portion 50 in the middle, a ring-like energizing coil 52 mounted on the fitting portion 50 in the field 51, and a shaft 53 inserted in the field 51 to be rotatable about an axis thereof. A rotor 55 formed with a circumferentially extending slit (through hole) 54 is fixed on the shaft 53 near the energizing coil 52.

A gear 56 is rotatably mounted onto the shaft 53 at a position opposing the energizing coil 52 with the rotor 55 interposed between the gear 56 and the energizing coil 52. The gear 56 is rotatable when a rotating force from an external device is transmitted thereto. An armature 57 is mounted on the shaft 53 opposing to the gear 56 with a plate spring 58 interposed between the armature 57 and the gear 56. Specifically, the armature 57 and the gear 56 are integrally assembled with the plate spring 58 in such a manner that the plate spring 58 is fixed to the armature 57 by swaging projections 59 which are integrally and circumferentially formed on a surface of the armature 57 with the plate spring 58 simultaneously mounted on the gear 56 by screws 60 at plural positions circumferentially.

Annular grooves 61, 62 are formed in opposite ends of the shaft 53. Fitting ring-like engaging pieces 63, 64 respectively in the annular grooves 61, 62 prevents the field 51 and the gear 56 from disengaging from the shaft 53. Note that at least the field 51, shaft 53, rotor 55, and armature 57 are made of a magnetized material such as ferrite metal.

In the above-constructed electromagnetic clutch, when the energizing coil 52 is excited, the armature 57 is magnetically attracted to the rotor 55 against a spring force of the plate spring 58, and thus, a rotation of the gear 56 is transmitted to the rotor 55 to rotate the shaft 53. On the other hand, when the energizing coil 52 is de-energized, the armature 57 springs away from the rotor 55 and returns to the original position opposing the gear 56 due to a restoration force of the plate spring 57. Thereby, the rotation of the shaft 53 is suspended.

In the electromagnetic clutch shown in FIG. 8, assembling operations such as tightly fixing the plate spring 58 onto the armature 57 by swaging or the like and fixing the plate spring 58 on the gear 56 with screws are required, which makes the assembling operation complex and may result in raising the production cost of the electromagnetic clutch with a difficulty in reducing the size of the plate spring 58. Further, it is highly likely that variation of a swaging force and a fixing force may occur at the swaging and fixing operation, which may resultantly vary the resilient performance of the plate spring 58. In view of the above possibility, swaging/fixing operation should be carried out with caution, which may deteriorate the assembling efficiency.

Figure 9A:
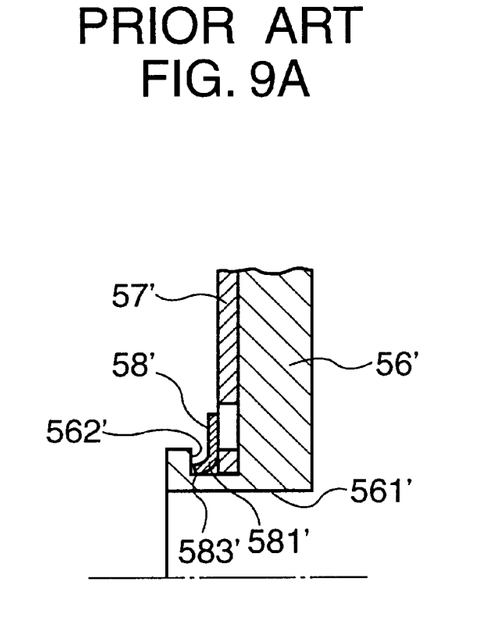
FIGS. 9A and 9B are diagrams showing essential parts of another electromagnetic clutch of prior art.
Figure 9B:
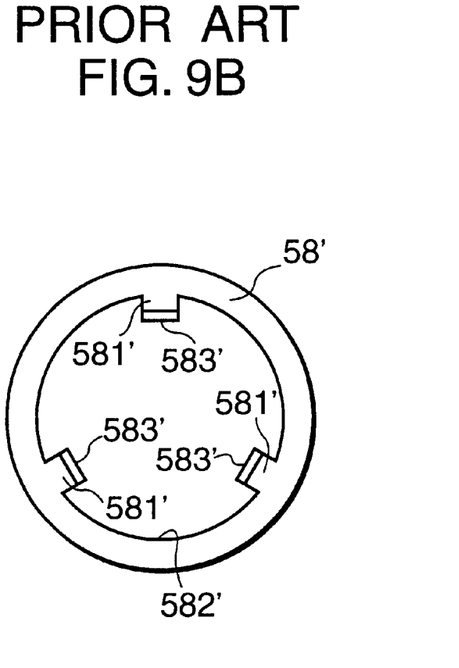

Another arrangement of the electromagnetic clutch has been proposed (for example, in Japanese Examined Utility Model Publication No. 7-24666) as shown in FIGS. 9A and 9B. FIG. 9A is a partially sectional view illustrating a state that an armature is mounted on a gear, and FIG. 9B is a plan view of a spring used in this electromagnetic clutch.

As shown in FIG. 9A, the electromagnetic clutch is constructed in such a manner that an armature 57' is mounted on a gear 56' together with a ring-like spring 58' formed with a through hole 582' in the center thereof. As shown in FIG. 9B, the ring-like spring 58' is formed with radially inwardly protruding projections 581' along an inner circumference thereof at a certain interval. Each projection 581' is formed with a bent portion 583' at a lead end thereof. Placing the armature 57' along a fitting groove 562' formed in a circumference of the gear 56' near a through hole 561' of the gear 56' and press-fitting the armature 57' into the fitting groove 562' resiliently holds the armature 57' in the gear 56'.

The electromagnetic clutch shown in FIGS. 9A and 9B (namely, the latter arrangement) can omit the swaging/fixing operation which has been required in the electromagnetic clutch shown in FIG. 8 and simplify the assembling operation to some extent which may contribute to lowering the production cost of the electromagnetic clutch to some extent. The latter arrangement may also be advantageous in improving assembling efficiency because merely press-fitting the ring-like spring 58' into the fitting groove 562' accomplishes mounting of the armature 57' onto the gear 56'. However, the latter arrangement necessitates an additional step of forming the bent portion 583' at the lead end of the projection 581' after press-molding the ring-like spring 58'. Further, the latter arrangement has a difficulty in producing a small-sized spring 58' due to the existence of the radially inwardly protruding projections 581', thereby likely to raise the production cost of the electromagnetic clutch as a whole.

SUMMARY OF THE INVENTION

In view of the above, an object of the present invention is to provide an electromagnetic clutch having a structure that enables to simplify the assembling operation of the electromagnetic clutch and to reduce the production cost thereof.

According to an aspect of this invention, an electromagnetic clutch comprises: a rotatable shaft; a field coil having an energizing coil mounted on the shaft; an output-side rotary member which is non-rotatably mounted on the shaft on a side opposing to the field coil; an input-side rotary member which is rotatably mounted on the shaft; a drive transmitting member rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized. The input-side rotary member includes a tubular part into which the shaft is inserted and a plurality of slip stopper projections formed at a lead end on an outer periphery of the tubular part circumferentially at a certain interval, and the drive transmitting member is formed with a through hole and a plurality of radially inwardly protruding projections at respective positions corresponding to spaces between the adjacent slip stopper projections, the drive transmitting member being held on the input-side rotary member in a state that the tubular part is fitted in the through hole of the drive transmitting member, and the elastic member in a ring shape resilient material having a radial thickness greater than a radial distance between an outer surface of the tubular part of the input-side rotary member and an innermost end of the projection of the drive transmitting member mounted on the tubular part, the elastic member being mounted on the tubular part between the slip stopper projections and the drive transmitting member.

In this arrangement, when the energizing coil is excited, and a magnetic attraction force of magnetically attracting the drive transmitting member toward the output-side rotary member is generated, the drive transmitting member is attracted toward the output-side rotary member against a resilient force of the ring member with the projections formed on the drive transmitting member pressing the portions of the ring member corresponding to the spaces between the adjacent slip stopper projections of the input-side rotary member. Thus, the drive transmitting member is magnetically attracted to the output-side rotary member, and the rotation of the input-side rotary member is transmitted to the output-side rotary member via the drive transmitting member to rotate the shaft followed by the rotation of the input-side rotary member.

On the other hand, when the energizing coil is de-energized, the magnetic attraction force of the input-side rotary member is gone, and the drive transmitting member springs back to the original position away from the output-side rotary member due to the restoring force of the ring member to thereby suspend the rotation of the shaft.

These and other objects, features, aspects, and advantages of the present invention will become more apparent from the following detailed description of the preferred embodiments/examples.

BRIEF DESCRIPTION OF THE DRAWINGS

FIGS. 3A and 3B are diagrams each showing a construction of a gear constituting the electromagnetic clutch in which FIG. 3A is a front view of the gear and FIG. 3B is a cross-sectional view of the gear taken alone the line 3B—3B in FIG. 3A.

FIGS. 6A and 6B are diagrams showing another arrangement of the gear in which FIG. 6A is a front view of the gear and FIG. 6B is a cross-sectional view of the gear taken along the line 6B—6B in FIG. 6A.

DESCRIPTION OF THE PREFERRED EMBODIMENTS

Figure 1:
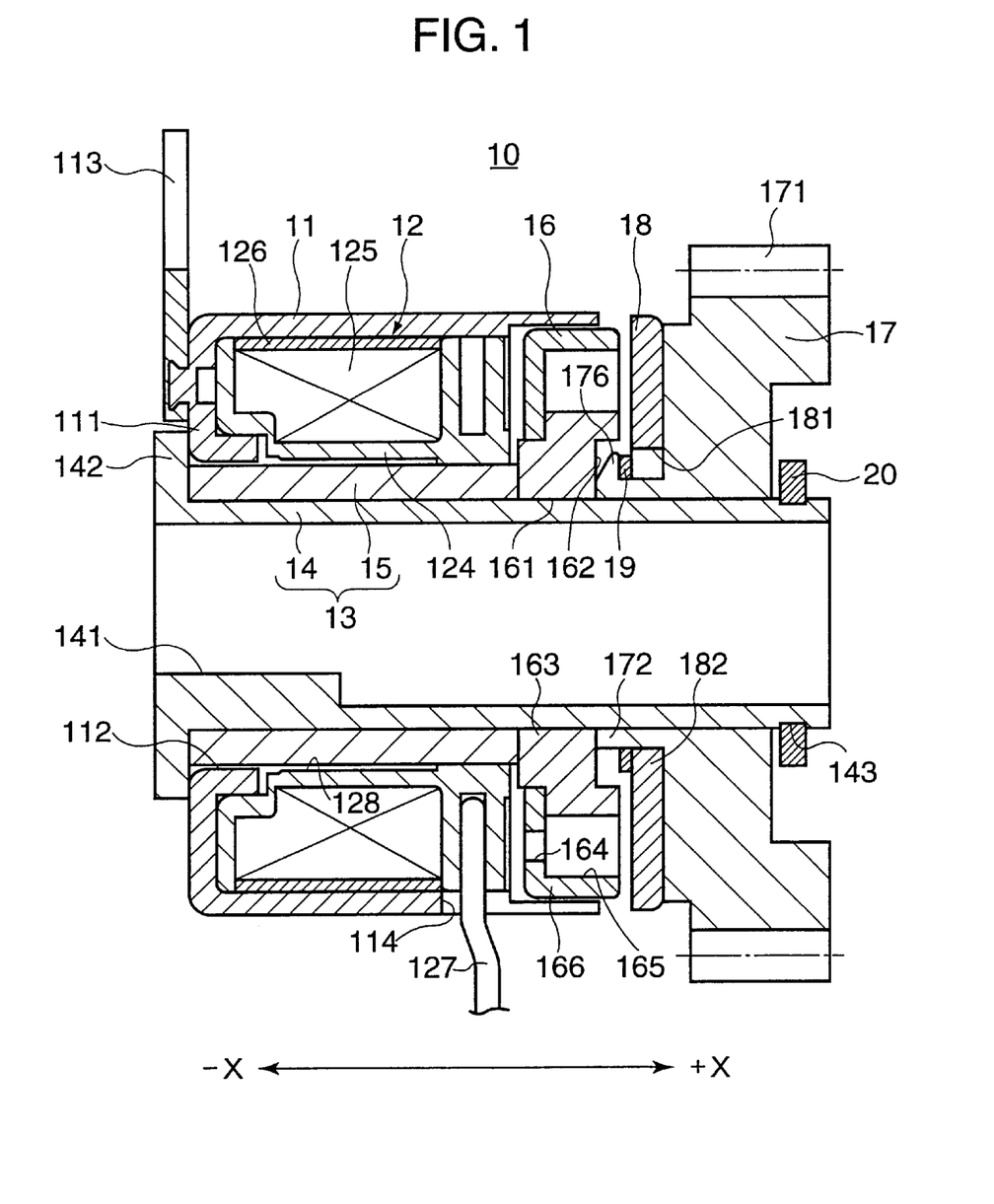
FIG. 1 is a cross-sectional view of an electromagnetic clutch according to an embodiment of this invention.
Figure 2:
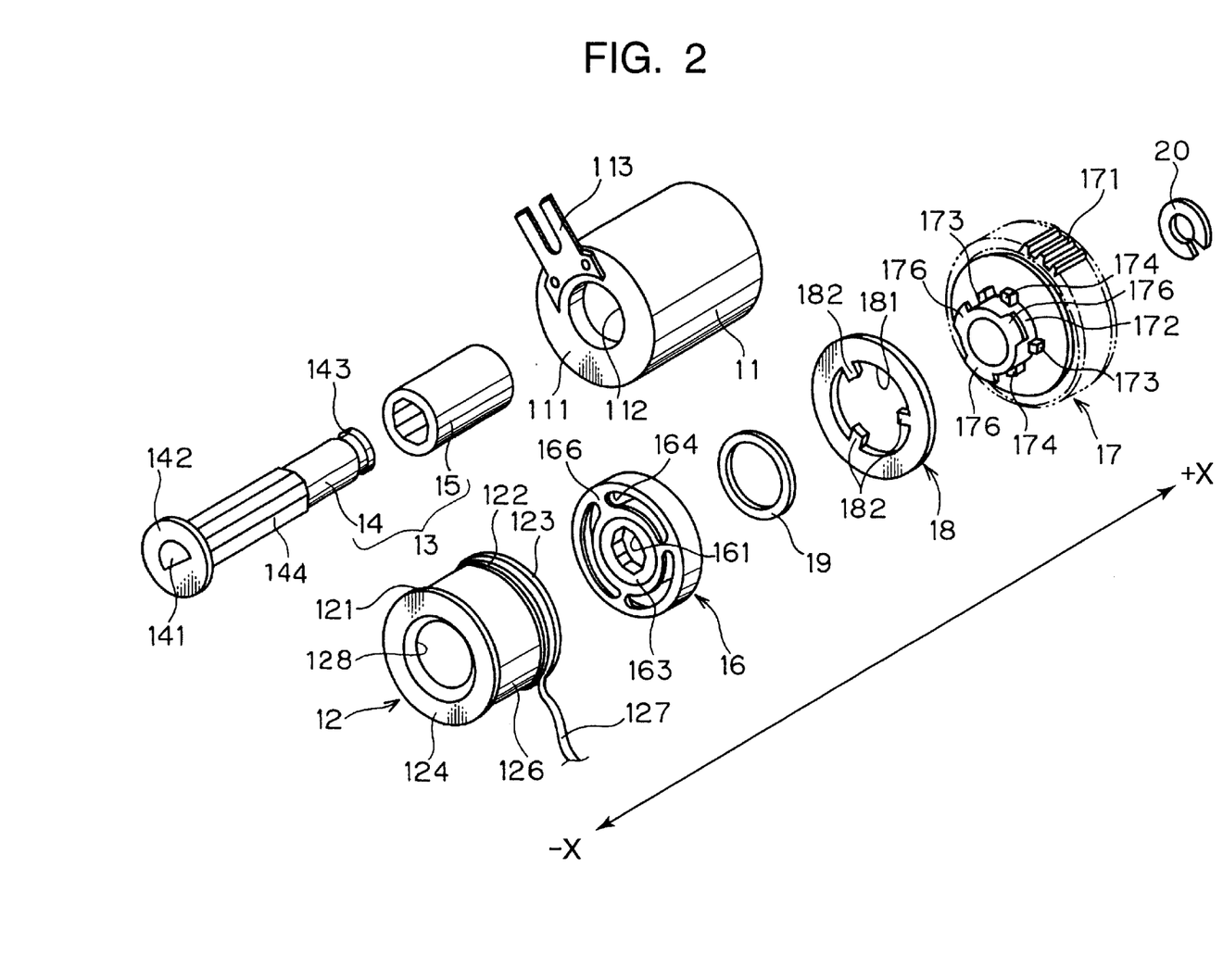
FIG. 2 is an exploded perspective view of the electromagnetic clutch.

FIG. 1 is a cross-sectional view of an electromagnetic clutch embodying this invention, and FIG. 2 is an exploded perspective view of the electromagnetic clutch. An electromagnetic clutch 10 has a housing (field) 11. A bottom part 111 of the housing 11 is formed with a through hole 112 substantially in the middle thereof, and a rotation stopper 113 extending radially outwardly is fixed on the bottom part 111. The housing 11 is made of a magnetized material such as ferrite metal, and is formed with a notch 114 (see FIG. 1) through which a wire 127 of an energizing coil 12 is drawn outside.

The energizing coil 12 is unmovably housed in the housing 11. The energizing coil 12 is constructed in such a manner that a bobbin 124 is formed with three flanges 121, 122, 123 and that a lead wire 127 is wound around the bobbin 124 over the area between the flanges 121 and 122. The area of the bobbin 124 where the lead wire is wound between the flanges 121 and 122 constitutes a coil section 125 of the energizing coil 12. An insulating sheet 126 shields around the outer surface of the coil section 125, and the opposite ends of the wire 127 exposing out of the insulating sheet 126 are fixed between the flanges 122, 123 and drawn outside through the notch 114 of the housing 11. Note that a through hole 128 extending in an axial direction of the bobbin 124 has substantially the same diameter as that of the through hole 112 of the housing 11.

A shaft 13 is rotatably inserted in the through hole 128 of the energizing coil 12 which is housed in the housing 11. The shaft 13 includes a core shaft 14 which is made from a resin molding and an outer tubular casing 15 which is made of a magnetized material such as ferrite metal and is mounted on the core shaft 14.

The core shaft 14 is formed with a through hole 141 extending axially to insert an external device (not shown), a flange 142 at an axial end thereof which is brought into contact with the outer surface of the bottom part 111 of the housing 11, and an annular groove 143 along an outer perimeter at the opposite end of the core shaft 14. A ring-like engaging member 20 such as a washer is fitted in the annular groove 143.

The through hole 141 of the core shaft 14 has a substantially D-shape as viewed from the left side in FIG. 2 (on the plane orthogonal to the axial direction of the core shaft 14) to prevent a relative rotation of the external shaft of the external device to the shaft 13. The outer circumference of the core shaft 14 has a substantially regular decagonal shape in cross section on the plane orthogonal to the axial direction of the shaft 13 partially, as shown in FIG. 2, over an area from the location where the flange 142 is formed to a location slightly beyond the axially intermediate position toward the opposite end of the core shaft 14 to prevent a relative rotation of the core shaft 14 to the tubular casing 15. The part corresponding to the regular decagonal shape of the core shaft 14 constitutes an engaging portion 144. The tubular casing 15 and a rotor 16, which is described below, are mounted on the engaging portion 144 of the core shaft 14.

The inner circumference of the tubular casing 15 is formed with a substantially regular decagonal shape in cross-section on the plane orthogonal to the axial direction of the tubular casing 15, as shown in FIG. 2, to match with the regular decagonal shape of the engaging portion 144 of the core shaft 14. The core shaft 14 is inserted into the tubular casing 15 from the end opposite to the flange 142 (namely, on the end of the core shaft 14 where the annular groove 143 is formed) to such an extent that the flange 142 of the core shaft 14 abuts against the outer surface of the bottom part 111 of the housing 11 and is fixed thereat.

The tubular casing 15 has an outer diameter slightly smaller than the diameter of the through hole 128 of the bobbin 124, and a length generally equal to the sum of the thickness of the bottom part 111 of the housing 11 and the length of the bobbin 124.

As shown in FIG. 2, the energizing coil 12, the rotor 16, a ring member 19, an armature 18, and a gear 17 are mounted on the shaft 13 in the direction of +X in this order. From now on, the side on which the part is mounted is shown by −X side or +X side.

The rotor 16 (output-side rotary member) is mounted on the shaft 13 on +X side of the energizing coil 12 in such a manner that the outer circumference thereof opposes the inner circumference of the housing 11. In FIG. 1, part of the rotor 16 is projected in +X direction from an axial end of the housing 11 in the drawing. However, any configuration of the rotor 16 may do as long as at least part of the rotor 16 opposes the inner circumference of the housing 11 in the axial direction on +X side.

The rotor 16 is made of a magnetized material such as ferrite metal. The rotor 16 is formed with a through hole 161 in a substantially middle thereof to insert the shaft 13, an inner annular section 163 which directly surrounds the through hole 161, a plurality of slits 164 (three through holes 164 in this embodiment) each extending along a circumference of the rotor 16 by a certain length, and an outer annular section 166 in the order of radially outwardly direction. The inner annular section 163 is formed with a recess 162 (see FIG. 1) on +X side of the rotor 16 while the outer annular section 166 is formed with a recess 165 (see FIG. 1) on +X side of the rotor 16.

As shown in FIG. 2, the inner circumference of the inner annular section 163 (namely, the contour of the through hole 161) has a substantially regular decagonal shape in cross-section on the plane orthogonal to the axial direction of the rotor 16 in conformity with the shape of the outer circumference of the engaging portion 144 of the core shaft 14 to prevent a relative rotation of the shaft 13 to the rotor 16. Thus, the rotor 16 is non-rotatably mounted on the shaft 13 with the engaging portion 144 of the core shaft 14 fitted in the through hole 161 of the rotor 16.

The gear 17 (input-side rotary member) is mounted on the shaft 13 on +X side of the rotor 16 to be rotatable about the axis of the shaft 13. The gear 17 is, for instance, made from a resin molding. A number of teeth 171 are equidistantly formed along the outer circumference of the gear 17, and a tubular part 172 axially extending toward the rotor 16 is formed at a substantially middle of the gear 17. The tubular part 172 is formed with a through hole to insert the shaft 13. The rotor 16 is fitted on the tubular part 172 to such an extent that a lead end of the tubular part 172 is abutted against the bottom surface of the recess 162 of the rotor 16.

Figure 3A:
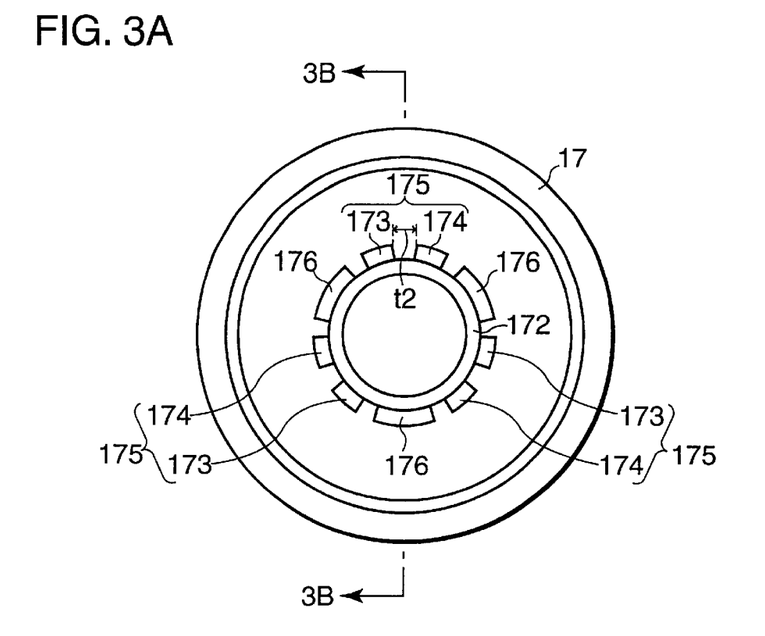
Figure 3B:
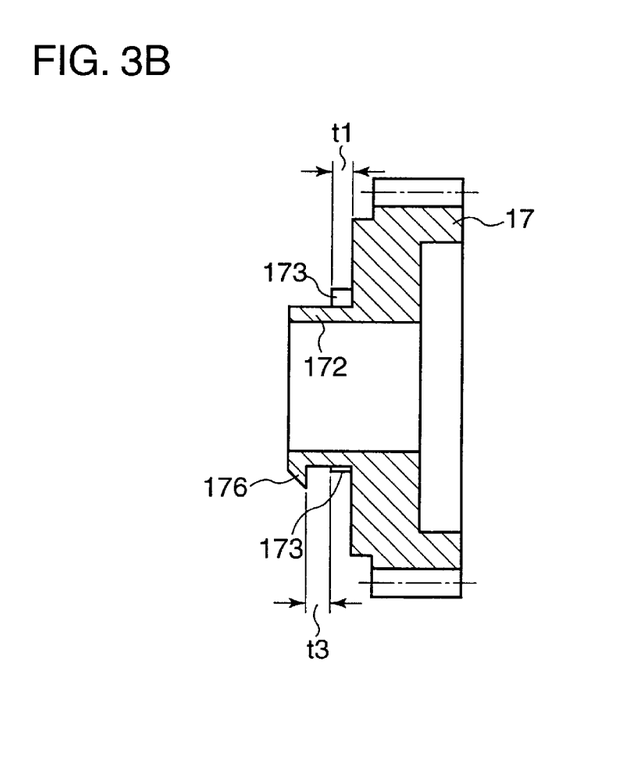

A plurality of position restrainers 175 (three position restrainers 175 in this embodiment) each consisting of a pair of position restricting projections 173, 174 are provided along the outer circumference of the tubular part 172 equidistantly, as shown in FIGS. 3A and 3B. Each projection 173 (174) radially projects outwardly on the circumferential surface of the tubular part 172. The projection 173 (174) has a thickness t1 in the axial direction of the shaft 13 which is slightly greater than the thickness of the armature 18, and an interval (distance) t2 between each pair of projections 173, 174 is set slightly larger than the width of a projection 182 of the armature 18, which is described below.

A radially projecting slip stopper projection 176 is formed at a lead end on an outer periphery of the tubular part 172 at a position corresponding to a space between the adjacent position restrainers 175. Since there are three position restrainers 175 in this embodiment, three slip stopper projections 176 are formed on the gear 17 in this embodiment. An axial distance t3 between the slip stopper projection 176 and the projection 173 (174) is set substantially the same as the thickness of the ring member 19 which is described below. The slip stopper projection 176 has a surface inclined away from the rotor 16 as radially outwardly extending from the outer periphery of the tubular part 172 (namely, a tapered portion as shown in FIG. 3B). Specifically, the configuration of the slip stopper projection 176 is such that the diameter thereof increases from −X side toward +X side, as shown in FIG. 3B.

The generally ring-shaped armature 18 (as a drive transmitting member) is provided on −X side of the gear 17 in such a manner that a through hole 181 having a diameter larger than the diameter of the outer surface of the tubular part 172 is formed in the middle to be mounted on the tubular part 172. The armature 18 is made of a magnetized material such as ferrite metal. The outer diameter of the armature 18 is set generally the same as that of the rotor 16, and the radially inwardly protruding projections 182 (three projections 182 in this embodiment) are circumferentially formed along the perimeter of the through hole 181 at a certain interval. Each projection 182 is fitted in the space defined by the corresponding pair of projections 173, 174 and, thus, the armature 18 has its free rotation restricted and is enabled to rotate with the gear 17.

Note that, in this embodiment, a −X side surface of each projection 182 is made flush with a −X side surface of an annular portion of the armature 18, and a +X side surface thereof is also made flush with a +X side surface of the annular portion of the armature 18. Alternatively, at least −X side surface of the projections 182 may be set flush with the −X side surface of the annular portion of the armature 18.

The ring member 19 (as an elastic member) is fitted in the axial space defined by the position restrainers 175 and the stopper projections 176 of the tubular part 172. The ring member 19 is made of an elastic polymer such as a synthetic resin including polyester and rubber, with its inner diameter slightly larger than the diameter of the cylindrical portion of the tubular part 172 and its outer diameter smaller than the diameter of the through hole 181 of the armature 18. The ring member 19 is adapted to prevent disengagement of the armature 18 from the gear 17 due to resilient contact of the projections 182 with the ring member 19 even if the armature 18 is urged away from the gear 17 toward the rotor 16 when the energizing coil 12 is excited.

The ring member 19 is adapted to set the armature 18 away from the gear 17 toward the rotor 16 against its resilient force when the energizing coil 12 is excited. The ring member 19 is made of a thin plate-like material and has a thickness significantly smaller than the thickness of the armature 18 (for example, one-fourth to one-fifth of the thickness of the armature 18).

The ring member 19 is first placed on the tapered surface (slope) of the slip stopper projections 176, and is pushed toward the gear 17 in such a manner as the ring member 19 expands radially outwardly while climbing over the slope of the projections 176, namely, as the ring member 19 is resiliently deformed to seat the ring member 19 on the tubular part 172 between the slip stopper projections 176 and the position restrainers 175, i.e., between the slip stopper projections 176 and the armature 18 on the tubular part 172.

Note that the inner diameter of the ring member 19 may be set slightly smaller than or generally the same as the diameter of the outer surface of the tubular part 172.

Finally, the ring-shaped engaging member 20 (engaging means) such as a washer is fitted in the annular groove 143 of the core shaft 14. The flange 142 of the core shaft 14 in cooperation with the engaging member 20 secures positioning of the above-mentioned parts of the electromagnetic clutch 10 on the shaft 13.

The electromagnetic clutch 10 having the above construction is, for example, mounted on a sheet feed mechanism of an image forming apparatus such as a copier in the following manner. Specifically, an output shaft of the sheet feed mechanism is inserted in the D-shaped through hole 141 of the core shaft 14 constituting the shaft 13 in such a state that the rotation stopper 113 of the housing 11 is engaged with a fixing member provided in a main body of the image forming apparatus so that the housing 11 is kept non-rotatable relative to the output shaft. In this state, when a rotating force of an external power source is transmitted to the gear 17, the gear 17 is rotated in cooperation with the armature 18 about the axis of the shaft 13.

Figure 4:
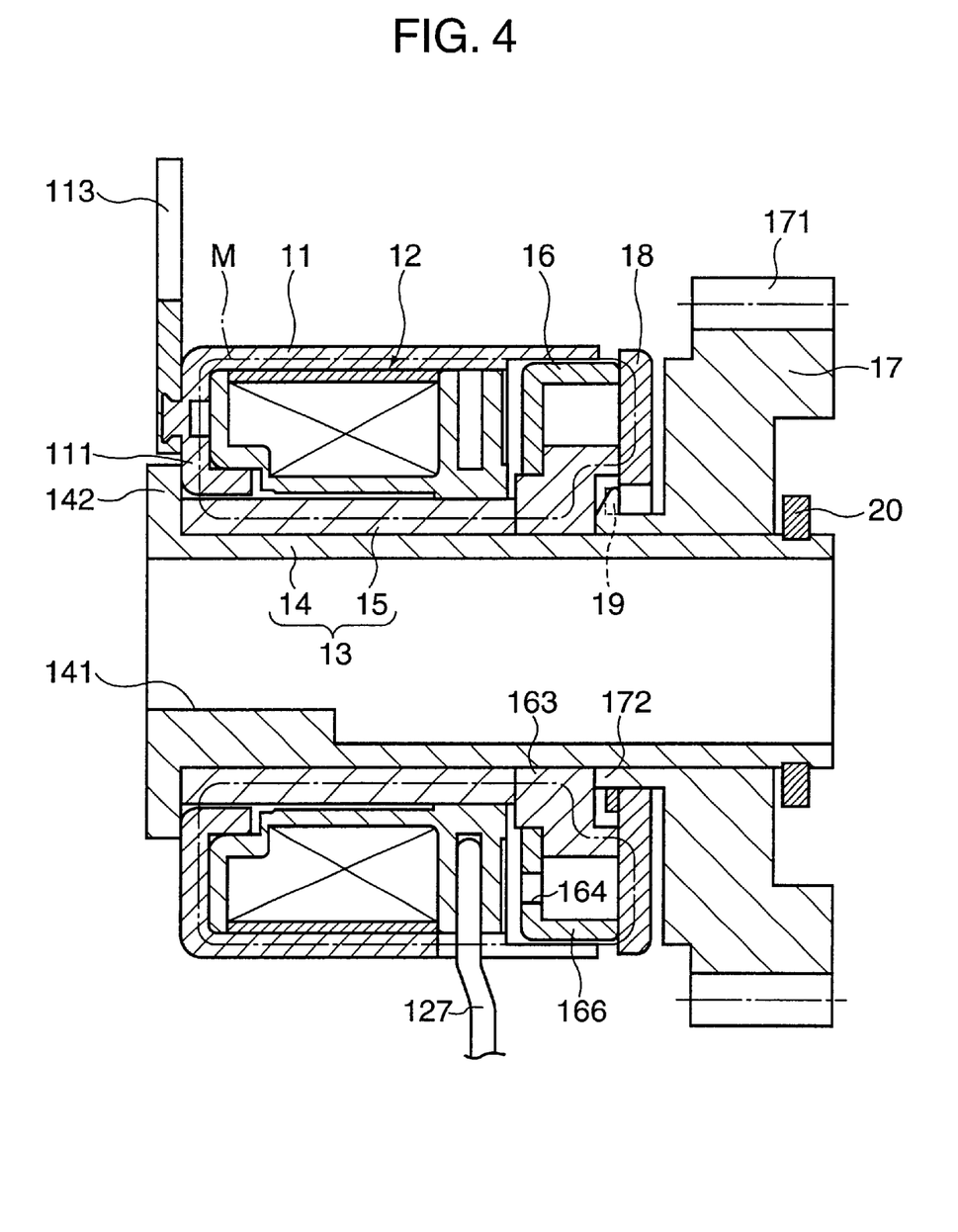
FIG. 4 is a cross-sectional view of the electromagnetic clutch.

Then, when the energizing coil 12 is excited (namely, a current flows through the wire 127), electromagnetic induction generates, and a flux of electromagnetic induction (magnetic flux) generates in the assembled parts of the housing 11, tubular casing 15, and rotor 16. In the arrangement of the inventive electromagnetic clutch, an electromagnetic resistance in the rotor 16 increases due to the existence of the through holes (slits) 164. As a result, the magnetic flux passes via the armature 18 in the vicinity of the rotor 16. As a result, a magnetic attraction force to draw the armature 18 toward the rotor 16 generates around the rotor 16, and, as shown in FIG. 4, the armature 18 is magnetically attracted to the rotor 16 against a resilient force of the ring member 19. Note that the broken line indicated by M in FIG. 4 denotes a line of electromagnetic induction which is generated in the electromagnetic clutch 10 via the armature 18.

Figure 5A:
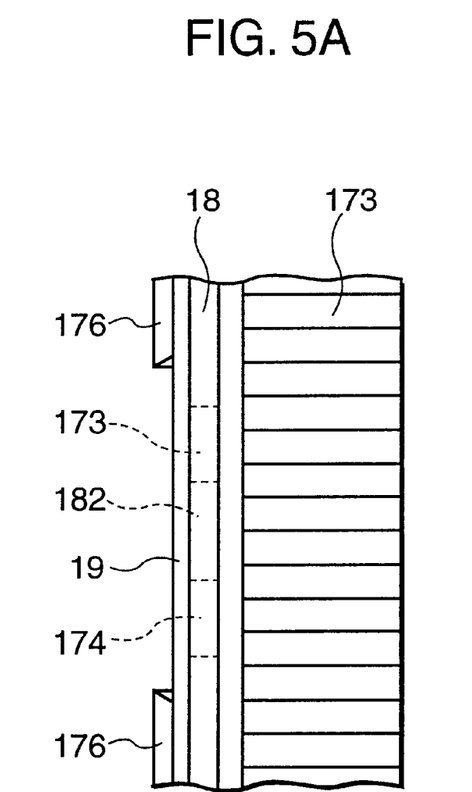
FIGS. 5A and 5B are plan views showing essential parts of the gear.
Figure 5B:
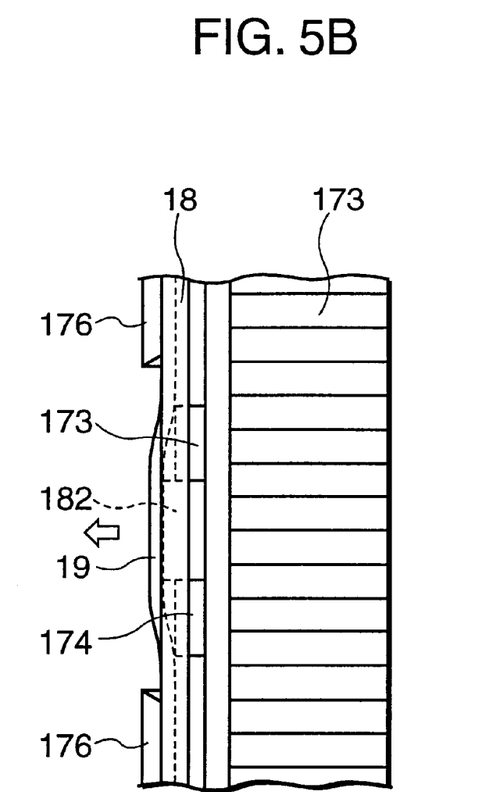

More specifically, before the armature 18 is magnetically attracted to the rotor 16, the ring member 19 is free from a pressing force of the armature 18. In other words, before the energizing coil 12 is excited, as shown in FIG. 5A, the ring member 19 is not resiliently deformed. However, once the energizing coil 12 is excited, and an electromagnetic induction occurs, the armature 18 is magnetically attracted to the rotor 16 due to a magnetic attraction force generated around the rotor 16. Then, as shown in FIG. 5B, the ring member 19 is elastically deformed such that portions thereof corresponding to the spaces between the adjacent projections 176 (namely, the spaces between each pair of position restricting projections 173, 174) are pressed by the projections 182 of the armature 18 toward the rotor 16, and the entirety of the ring member 19 is elastically expanded in the direction of arrow in FIG. 5B. Thus, the armature 18 is magnetically attracted to the rotor 16 against a resilient force of the ring member 19, and the rotor 16 is rotated with the armature 18 with the result that the rotation of the gear 17 is transmitted to the shaft 13 to thereby rotate the shaft 13 followed by the rotation of the gear 17.

On the other hand, when the energizing coil 12 is de-energized (namely, current flow to the wire 127 is ceased), the magnetic flux M is gone, and accordingly the magnetic attraction force which has magnetically attracted the armature 18 to the rotor 16 is gone. Thereby, the pressing force of the armature 18 to press the ring member 19 toward the rotor 16 is released. As the pressing force is released, the ring member 19 which has been resiliently deformed while the energizing coil 12 has been excited returns to the original state due to its restoring force, and the armature 18 springs back to the original position away from the rotor 16. Thus, the transmission of the rotating force of the gear 17 to rotate the shaft 13 is cut off, and the rotation of the shaft 13 is suspended.

In the embodiment, the ring member 19 has a simple annular configuration made of an elastic polymer with a flat plate-like shape in side view. Accordingly, production of the ring member 19 is easy by punching a plate-like sheet made of such material, slicing a tubular material, molding or the like. Further, the ring member 19 can be fitted on the tubular part 172 of the gear 17 by resiliently mounting over the projections 176 accompanied by radial expansion. These features of the ring member 19 enable to simplify the assembling operation of the electromagnetic clutch 10 and lower the production cost thereof.

Furthermore, the armature 18 has such a configuration that at least −X side surface of the projections 182 (namely, the surface on the side of the rotor 16) is formed flush with the annular part of the armature 18, and this −X side surface of the projections 182 makes contact with a +X side surface of the ring member 19 (namely, the surface on the side of the gear 17). This arrangement enables to keep an elastic deformation amount of the ring member 19 generally constant while the armature 18 is attracted to the rotor 16 and suppress variation of the magnetic attraction force of attracting the armature 18 toward the rotor 16, even if the axial thickness of the armature 18 varies among the products.

The variation of the thickness of the ring member 19 may adversely affect the resilient performance of the ring member 19, which may consequently vary the magnetic attraction force of the rotor 16. However, since the thickness of the ring member 19 is very small compared to the thickness of the armature 18, the variation of the thickness thereof, if any, is negligible. Thus, a constant resilient force of the ring member 19 is obtained without a possibility of varying the magnetic attraction force of the rotor 16.

An operation time required for the armature 18 to be securely attracted to the rotor 16 is generally determined by the axial distance between the +X side surface of the ring member 19 and the rotor 16 because this distance is the amount the ring member 19 needs to be compressed by. Therefore, as long as the thickness of the armature 18 (namely, the thickness of the projection 182) is set at such a value as to form a clearance to the ring member 19, i.e., no deformation of the ring member 19 takes place, substantially a constant operation time is spent until the armature 18 makes contact with the rotor 16 regardless of the variation of the thickness of the armature 18 among the products.

The electromagnetic clutch according to this invention is not limited to the one shown in the embodiment but various modifications and alterations as described below are applicable.

(1) In the embodiment, the ring member 19 is mounted on the tubular part 172 of the gear 17 while radially and expansively mounted over the slopes of the projections 176. Alternatively, the ring member 19 may be seated on the tubular part 172 between the position restrainers 175 and the projections 176 after radially expanding the ring member 19 by a jig or the like. The altered arrangement enables to simplify the assembling operation of the electromagnetic clutch. In this case, the slopes on −X side of the projections 176 of the gear 17 can be omitted.

Alternatively, the ring member 19 may be jointed on the tubular part 172 by winding a strip-like elastic member on the tubular part 172 between the position restrainers 175 and the projections 176 and fusing the opposite ends of the elastic member thereon. In this case, also, production of the ring member 19 is feasible to thereby simplify the assembling operation of the electromagnetic clutch. It is needless to say that the projections 176 on −X side may not be necessarily formed into a slope.

(2) In the embodiment, the ring member 19 has a flat plate-like shape in side view. As an altered form, the ring member 19 may have a doughnut-like shape. In this case, since the ring member 19 also has a simple annular configuration, production of the ring member 19 is easy which contributes to production cost reduction.

(3) In the embodiment, the ring member 19 is made of a polymer having elasticity. The ring member 19 may be made of a resilient metallic material such as stainless steel. In the case where the ring member is made of such a metallic material, the thickness of the ring member can be reduced compared to the one made of a polymer because the metallic material has a greater mechanical rigidity. A gear 17 of an altered form when the ring member is made of a metallic material is shown in FIGS. 6A and 6B.

Figure 6A:
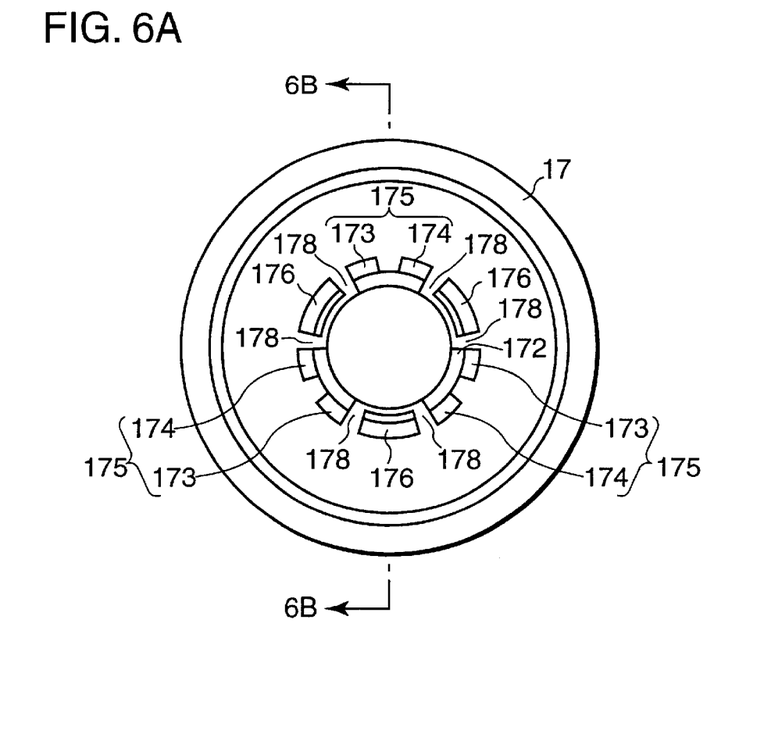
Figure 6B:
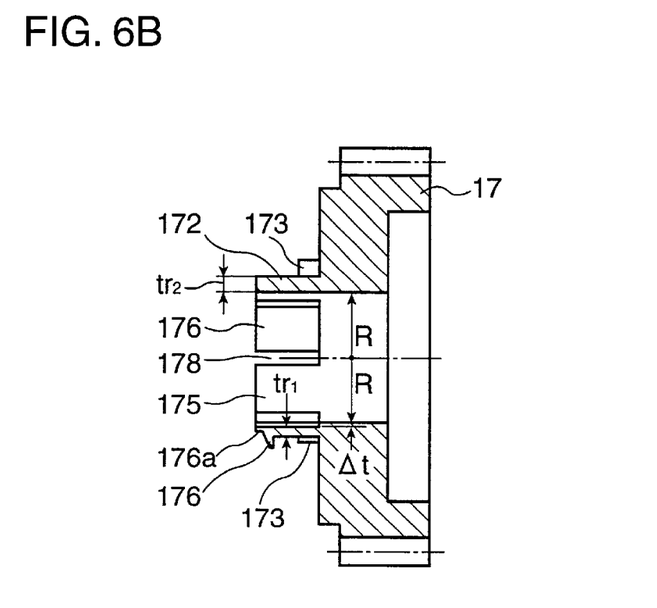

Specifically, FIG. 6A is a front view of the gear 17, and FIG. 6B is a cross-sectional view of the gear 17 taken along the line 6B—6B in FIG. 6A. A tubular part 172 of the gear 17 is constructed such that an axially extending slit 178 is formed in circumferentially opposite ends of each projection 176. The tubular part 172 where the projections 176 are formed has a radial thickness tr1 smaller than a thickness tr2 of the other part by Δt. Note designated by "R" is an inner radius of the tubular part 172 with the projections 173, 174 formed thereon. This configuration enables to resiliently deform the tubular part 172 in such a manner that the projections 176 are deformed radially inwardly when an external force is applied to the projections 176.

In the altered arrangement, the ring member 19 made of a resilient metallic material is mounted over the projections 176 which are contracted radially inwardly, and is seated on the tubular part 172. Thereafter, the contracted projections 176 are expanded to the original state due to a resilient force of the tubular part 172, thereby fitting the ring member 19 between the projections 176 and the position restrainers 175 on the tubular part 172.

A hook portion 176a is formed at a tip of each projection 176. Engaging a jig at the hook portion 176a and operating the jig enables to resiliently deform the projections 176 radially inwardly. As shown in the altered form of FIGS. 6A and 6B, the tubular part 172 where the projections 176 are formed has the smaller radial thickness tr1 than the thickness tr2 of the other parts. This arrangement enables to resiliently contract the projections 176. Note that this arrangement is not necessarily required as long as the tubular part 172 is resiliently deformable.

As mentioned above, similar to the ring member made of a polymer having elasticity, the altered ring member made of a resilient metallic material can be easily produced by punching a metal sheet or the like. The altered arrangement also facilitates mounting of the ring member onto the tubular part 172, thus contributing to simplified assembling operation of the electromagnetic clutch and production cost reduction thereof.

(4) In the embodiment, the armature 18 is held on the gear 17 in a state that the ring member 19 is free from a pressing force of the armature 18 while the armature 18 is not attracted to the rotor 16. The thickness of the armature 18 may be increased. In this case, the armature 18 having a large thickness is held on the gear 17 in a state that the ring member 19 is pressed toward the rotor 16 by the thick armature 18.

(5) In the embodiment, at least the −X side surface of the projections 182 of the armature 18 is made flush with the same side surface of the annular part of the armature 18. Alternatively, the −X side surface of the projections 182 may be formed with a recess indenting away from the ring member 19. In this altered arrangement, when the projections 182 make contact with the ring member 19, the armature 18 is protruded toward the rotor 16 than the ring member 19.

(6) In the embodiment, each position restrainer 175 consists of a pair of position restricting projections 173, 174 engageable with the circumferential opposite ends of the corresponding projection 182 of the armature 18. As an altered form, the position restrainer 175 may consist of a single position restricting projection 173 (or 174). In the altered arrangement, alternately forming the projection 173 (174) that is engageable with either one of the circumferentially opposite ends of the projection 182 enables to keep the armature 18 non-rotatable relative to the gear 17.

Figure 7:
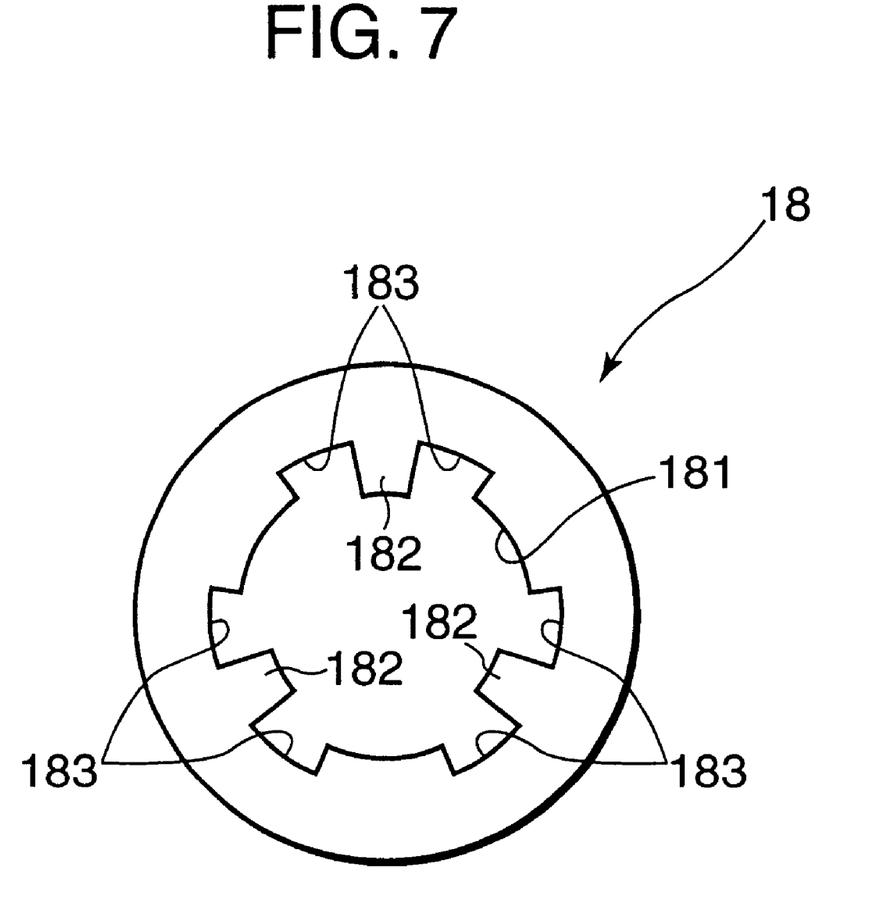
FIG. 7 is a diagram of another arrangement of the gear.

(7) In the embodiment, the projections 182 directly protrude toward the through hole 181 radially inwardly from the inner circumferential periphery of the armature 18. Alternatively, as shown in FIG. 7, a radially indenting recess 183 may be formed in circumferential opposite ends of each projection 182 along the through hole 181. This altered arrangement makes it possible to increase the radial thickness of the position restricting projections 173, 174 to thereby increase the mechanical rigidity of the tubular part 172 as a whole.

(8) In the embodiment, the armature 18 is held on the gear 17 in a state that the projections 182 engage with the respective pairs of position restricting projections 173, 174. Alternatively, a plurality of bores may be formed circumferentially at a certain interval in the armature 18, and the corresponding number of pins may be projectingly provided on the surface of the gear 17. Fitting the pins into the bores enables to non-rotatably mount the armature 18 relative to the gear 17.

(9) In the embodiment, the cylindrical portion of the tubular part 172 of the gear 17 has a continued surface. As an altered form, the surface of the tubular part 172 may be cut away in an axial direction thereof except the portions where the position restrainers 175 and the slip stopper projections 176 are formed to make the surface discontinuous. This altered arrangement also makes it possible to resiliently deform the tubular part 172 as a whole.

(10) In the embodiment, the shaft 13 is constructed by the core shaft 14 produced by molding a resin and the outer tubular casing 15 into which the core shaft 14 is press-fitted. In place of the double-layered structure, the shaft 13 may be produced by machining a metal shaft or by molding magnetized powder into a certain shape and sintering the same.

As mentioned above, according to an aspect of this invention, the electromagnetic clutch comprises: a rotatable shaft; a field coil having an energizing coil mounted on the shaft; an output-side rotary member which is non-rotatably mounted on the shaft on a side opposing to the field coil; an input-side rotary member which is rotatably mounted on the shaft; a drive transmitting member rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized. The input-side rotary member includes a tubular part into which the shaft is inserted and a plurality of slip stopper projections formed at a lead end on an outer periphery of the tubular part circumferentially at a certain interval. The drive transmitting member is formed with a through hole and a plurality of radially inwardly protruding projections at respective positions corresponding to spaces between the adjacent slip stopper projections. The drive transmitting member is held on the input-side rotary member in a state that the tubular part is fitted in the through hole of the drive transmitting member, and the elastic member in a ring shape resilient material having a radial thickness greater than a radial distance between an outer surface of the tubular part of the input-side rotary member and an innermost end of the projection of the drive transmitting member mounted on the tubular part, the elastic member being mounted on the tubular part between the slip stopper projections and the drive transmitting member.

In this arrangement, the elastic member such as a ring member is made of a resilient material. Merely mounting the ring member onto the tubular part enables to prevent disengagement of the drive transmitting member from the input-side rotary member. This arrangement facilitates the assembling operation of the electromagnetic clutch and contributes to production cost reduction.

According to another aspect of this invention, the resilient material of the elastic member includes a polymer. This arrangement facilitates mass production of the ring member.

According to still another aspect of this invention, the resilient material of the elastic member includes a metallic material. This arrangement enables to produce the ring member having durability.

According to yet another aspect of this invention, the ring member has a flat plate-like shape in side view.

In this arrangement, the thin ring member is easily flexed in a direction orthogonal to the diametrical plane thereof (namely in the axial direction of the shaft), thereby improving the operation precision of the electromagnetic clutch while facilitating production of the ring member. This arrangement also makes it possible to design the electromagnetic clutch having a desired elasticity of the ring member because the thickness of the ring member can be desirably changed according to needs and enables to design the electromagnetic clutch of a versatile use.

According to yet another aspect of this invention, the ring member has an inner diameter generally the same as an outer diameter of the tubular part.

This arrangement facilitates fitting of the ring member onto the tubular part and secures holding of the ring member stably on the tubular part.

According to still another aspect of this invention, the ring member is mounted on the tubular part by resiliently mounting over the slip stopper projections while radially expanding.

This arrangement facilitates mounting of the ring member onto the tubular part to thereby further simplify the assembling operation of the electromagnetic clutch.

According to further aspect of this invention, each of the slip stopper projection has a slope inclined toward the input-side rotary member as extending radially outwardly, and the ring member is mounted on the tubular part by placing the ring member on the slopes of the slip stopper projections and pushing the ring member toward the input-side rotary member in such a manner as to expand the ring member radially outwardly.

This arrangement contributes to easy mounting of the ring member onto the tubular part to thereby furthermore simplify the assembling operation of the electromagnetic clutch.

According to yet another aspect of this invention, each of the slip stopper projections is formed with an axially extending slit at opposite circumferential ends thereof to allow the slip stopper projections to deform radially inwardly when an external force is exerted thereto, and the ring member is mounted on the tubular part by mounting over the radially contracted slip stopper projections.

This arrangement facilitates mounting of the ring member onto the tubular part even if the ring member is made of a metallic material to thereby simplify the assembling operation of the electromagnetic clutch.

According to still another aspect of this invention, three slip stopper projections of the input-side rotary member and three projections of the drive transmitting member are respectively formed circumferentially and equidistantly.

In this arrangement, the ring member is uniformly pressed toward the output-side rotary member in a state that the ring member comes into pressing contact with the equidistantly arrayed three slip stopper projections of the input-side rotary member and is pressed at the portions corresponding to the equidistantly arrayed three projections of the drive transmitting member (namely, at the portions corresponding to the spaces between the adjacent slip stopper projections) when a magnetic induction occurs in the electromagnetic clutch.

According to yet another aspect of this invention, a surface of each of the projections of the drive transmitting member opposing the output-side rotary member is formed flush with an annular surface of the drive transmitting member opposing the output-side rotary member.

In this arrangement, the ring member interposed between the output-side rotary member and the drive transmitting member comes into contact with the projections of the drive transmitting member which are formed flush with the annular part of the drive transmitting member. This arrangement enables to keep the resilient force of the ring member generally constant even if the thickness of the drive transmitting member varies to thereby allow the drive transmitting member to be magnetically attracted toward the output-side rotary member with a substantially constant force.

According to yet another aspect of this invention, the tubular part of the input-side rotary member is formed with a position restrainer at a certain position of an outer periphery thereof for restricting a circumferential movement of the projections of the drive transmitting member.

In this arrangement, engaging the projections of the drive transmitting member with the position restricting projections of the tubular part of the input-side rotary member enables to mount the drive transmitting member non-rotatably relative to the tubular part to thereby securely rotate the drive transmitting member with the input-side rotary member.

The present invention has been described with reference to the present embodiments. Obviously, modifications and alterations will occur to others upon reading and understanding the proceeding detailed description. It is indeed that the present invention be construed as including all such modifications and alterations insofar as they come within the scope of the attended claims or the equivalents thereof.

What is claimed is:

1. An electromagnetic clutch comprising:
   a rotatable shaft;
   a field coil having an energizing coil mounted on the shaft;
   an output-side rotary member which is non-rotatably mounted on the shaft on a side opposing to the field coil;

an input-side rotary member which is rotatably mounted on the shaft;

a drive transmitting member rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized, wherein the input-side rotary member includes a tubular part into which the shaft is inserted and a plurality of slip stopper projections formed at a lead end on an outer periphery of the tubular part circumferentially at a certain interval, the drive transmitting member is formed with a through hole and a plurality of radially inwardly protruding projections at respective positions corresponding to spaces between the adjacent slip stopper projections, the drive transmitting member being held on the input-side rotary member in a state that the tubular part is fitted in the through hole of the drive transmitting member, and the elastic member in a ring shape resilient material having a radial thickness greater than a radial distance between an outer surface of the tubular part of the input-side rotary member and an innermost end of the projection of the drive transmitting member mounted on the tubular part, the elastic member being mounted on the tubular part between the slip stopper projections and the drive transmitting member.

2. The electromagnetic clutch according to claim 1, wherein the resilient material of the elastic member includes a polymer.

3. The electromagnetic clutch according to claim 1, wherein the resilient material of the elastic member includes a metallic material.

4. The electromagnetic clutch according to claim 2, wherein the ring member has a flat plate-like shape in side view.

5. The electromagnetic clutch according to claim 3, wherein the ring member has a flat plate-like shape in side view.

6. The electromagnetic clutch according to claim 1, wherein the ring member has an inner diameter generally the same as an outer diameter of the tubular part.

7. The electromagnetic clutch according to claim 2, wherein the ring member is mounted on the tubular part by resiliently mounting over the slip stopper projections while radially expanding.

8. The electromagnetic clutch according to claim 7, wherein each of the slip stopper projection has a slope inclined toward the input-side rotary member as extending radially outwardly, and the ring member is mounted on the tubular part by placing the ring member on the slopes of the slip stopper projections and pushing the ring member toward the input-side rotary member in such a manner as to expand the ring member radially outwardly.

9. The electromagnetic clutch according to claim 3, wherein each of the slip stopper projections is formed with an axially extending slit at opposite circumferential ends thereof to allow the slip stopper projections to deform radially inwardly when an external force is exerted thereto, and the ring member is mounted on the tubular part by mounting over the radially contracted slip stopper projections.

10. The electromagnetic clutch according to claim 1, wherein three slip stopper projections of the input-side rotary member and three projections of the drive transmitting member are respectively formed circumferentially and equidistantly.

11. The electromagnetic clutch according to claim 1, wherein a surface of each of the projections of the drive transmitting member opposing the output-side rotary member is formed flush with an annular surface of the drive transmitting member opposing the output-side rotary member.

12. The electromagnetic clutch according to claim 1, wherein the tubular part of the input-side rotary member is formed with a position restrainer at a certain position of an outer periphery thereof for restricting a circumferential movement of the projections of the drive transmitting member.

13. An electromagnetic clutch having a rotatable shaft, an output member which is non-rotatably mounted on the shaft on a side opposing to a field coil which is energized to attract an armature placed on an input member which is rotatably mounted on the shaft and said input member having a tubular portion; said electromagnetic clutch comprising:

a plurality of radially outwardly extending first projections formed on an axially remote end of the tubular portion and radially outwardly extending second projections formed on an axially root end of the tubular portion;

said armature having a through hole with a radially inwardly extending projection and being configured such that the armature can be axially freely shifted along and fitted onto the tubular portion and engageable with said second projections to rotate together with the input member; and a ring placed on the tubular portion and interposed between said first projections and said armature, having an inner surface with a radius smaller than a radial distance of the outermost ends of the first projections on the tubular portion and an outer surface with a radius greater than a radial distance of the innermost end of the radially inwardly extending projection.

* * * * *